United States Patent
Ohgi et al.

(10) Patent No.: US 9,131,091 B2
(45) Date of Patent: *Sep. 8, 2015

(54) DOCUMENT READING DEVICE AND IMAGE FORMING APPARATUS

(71) Applicant: FUJI XEROX CO., LTD., Minato-ku, Tokyo (JP)

(72) Inventors: Kazuyuki Ohgi, Yokohama (JP); Hiroko Saito, Yokohama (JP); Norio Irie, Yokohama (JP); Kazuhiro Tobita, Yokohama (JP); Mitsuyuki Ishida, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,446

(22) Filed: Nov. 4, 2014

(65) Prior Publication Data

US 2015/0055194 A1 Feb. 26, 2015

Related U.S. Application Data

(63) Continuation of application No. 13/090,021, filed on Apr. 19, 2011, now Pat. No. 8,908,241.

(30) Foreign Application Priority Data

Oct. 25, 2010 (JP) .................................. 2010-238343

(51) Int. Cl.
*H04N 1/04* (2006.01)
*H04N 1/00* (2006.01)
(Continued)

(52) U.S. Cl.
CPC ......... *H04N 1/00551* (2013.01); *G03G 15/605* (2013.01); *G03G 21/1619* (2013.01); *G03G 2215/00* (2013.01); *G03G 2221/1687* (2013.01); *H04N 2201/0081* (2013.01)

(58) Field of Classification Search
CPC ................... H04N 1/00551; H04N 2201/0081
USPC .................................. 358/474, 498, 497, 496
See application file for complete search history.

(56) References Cited

U.S. PATENT DOCUMENTS 7,447,466 B2 11/2008 Ikebata
7,970,337 B2 6/2011 Uchida et al.
(Continued)

FOREIGN PATENT DOCUMENTS

CN 101504523 A 8/2009
JP H07-146519 A 6/1995
(Continued)

OTHER PUBLICATIONS

Communication dated Dec. 3, 2014 from the State Intellectual Property Office of the People's Republic of China in counterpart application No. 201110157563.8.
Notification of Reasons for Refusal corresponding to Patent Application No. 2010-238343 dated May 23, 2014.

*Primary Examiner* — Houshang Safaipour
(74) *Attorney, Agent, or Firm* — Sughrue Mion, PLLC

(57) ABSTRACT

A document reading device includes: a document reading device main body; and an opening/closing body with one end supported rotatably with respect to the document reading device main body while another end openably/closably provided, the other end of the opening/closing body being provided with a handgrip having a depression sloped toward inside of the opening/closing body in accordance with approach of the opening/closing body to the document reading device main body in a closed status with respect to the document reading device main body.

11 Claims, 8 Drawing Sheets

(51) Int. Cl.
 *G03G 15/00* (2006.01)
 *G03G 21/16* (2006.01)

(56) References Cited

U.S. PATENT DOCUMENTS

| | | | |
|---|---|---|---|
| 8,511,670 B2 | 8/2013 | Maeda | |
| 8,526,068 B2 | 9/2013 | Yamada et al. | |
| 8,736,921 B2 | 5/2014 | Yamada et al. | |
| 8,908,241 B2 * | 12/2014 | Ohgi et al. | 358/498 |
| 2005/0200920 A1 * | 9/2005 | Uchida et al. | 358/498 |
| 2007/0098440 A1 | 5/2007 | Ikebata | |
| 2011/0180984 A1 | 7/2011 | Maeda | |

FOREIGN PATENT DOCUMENTS

| | | |
|---|---|---|
| JP | H09-114167 A | 2/1997 |
| JP | H10-221789 A | 8/1998 |
| JP | H10-10221789 A | 8/1998 |
| JP | 2002-365742 A | 12/2002 |
| JP | 2005-260827 A | 9/2005 |
| JP | 2006-050473 A | 2/2006 |
| JP | 2006-162744 A | 6/2006 |
| JP | 2007-124427 A | 5/2007 |
| JP | 2011-148615 A | 8/2011 |

* cited by examiner

DOCUMENT READING DEVICE AND IMAGE FORMING APPARATUS

CROSS-REFERENCE TO RELATED APPLICATION

This application is a Continuation Application of U.S. application Ser. No. 13/090,021, filed Apr. 19, 2011, which claims priority under 35 USC 119 from Japanese Patent Application No. 2010-238343, filed Oct. 25, 2010, the disclosures of which are incorporated herein by reference in their entirety.

BACKGROUND

Technical Field

The present invention relates to a document reading device and an image forming apparatus.

SUMMARY

According to an aspect of the present invention, there is provided a document reading device including: a document reading device main body; and an opening/closing body with one end supported rotatably with respect to the document reading device main body while another end openably/closably provided, the other end of the opening/closing body being provided with a handgrip having a depression sloped toward inside of the opening/closing body in accordance with approach of the opening/closing body to the document reading device main body in a closed status with respect to the document reading device main body.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described based on the drawings.

Figure 1:
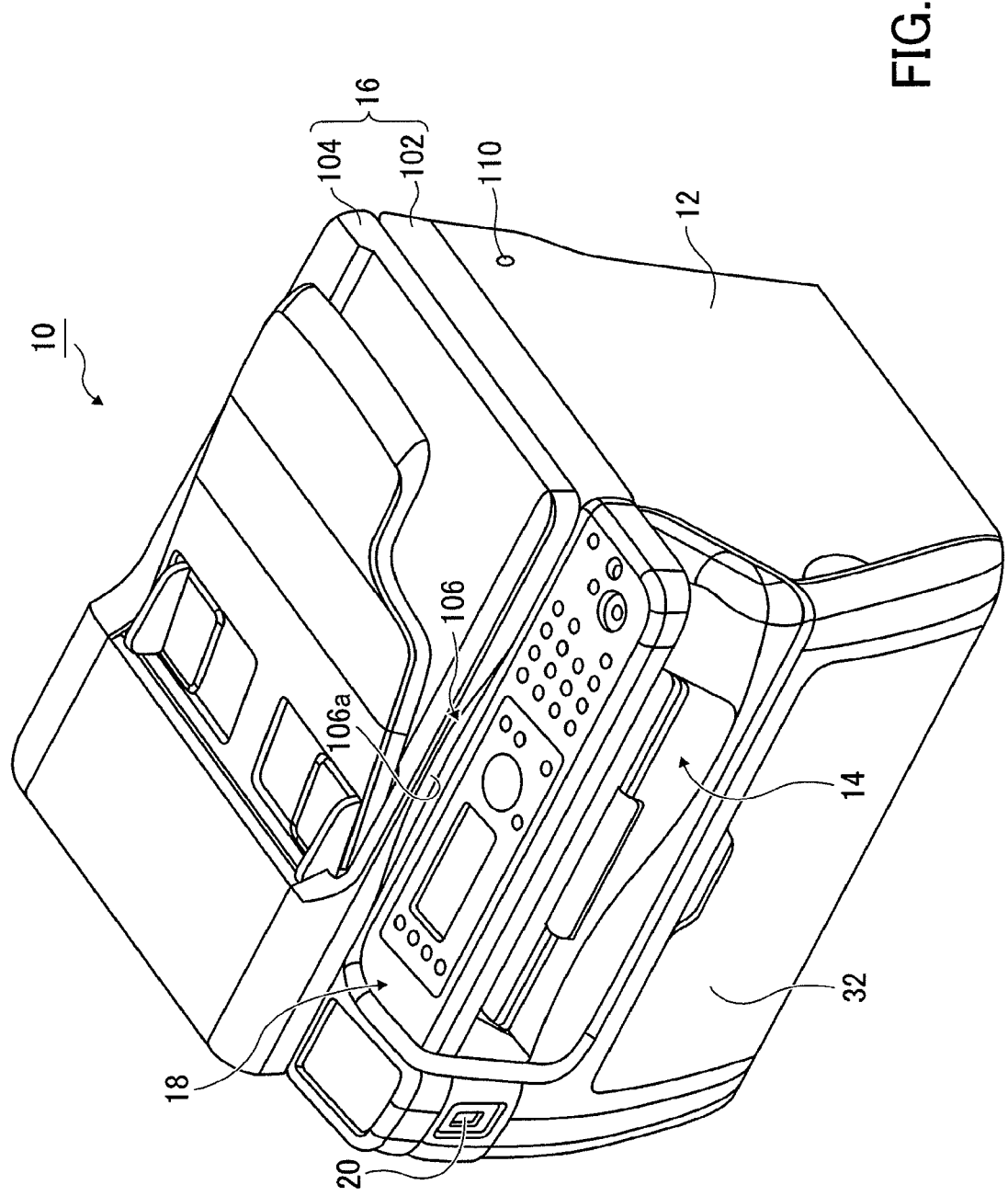
FIG. 1 is a perspective view of an image forming apparatus according to an exemplary embodiment of the present invention.
Figure 2:
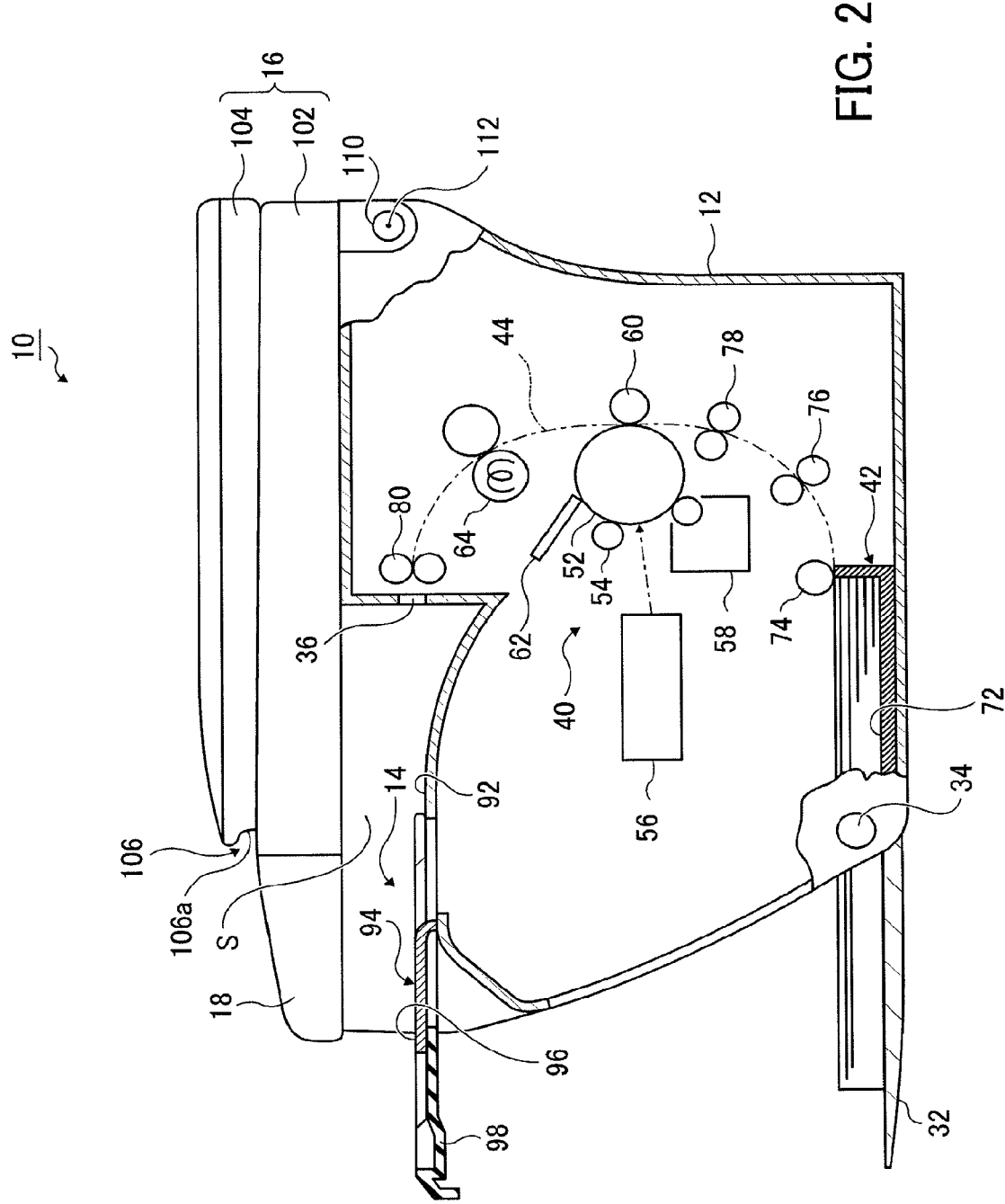
FIG. 2 is a cross-sectional view of the image forming apparatus according to an exemplary embodiment of the present invention viewed from a side surface.

FIG. 1 is a perspective view of an image forming apparatus 10 according to an exemplary embodiment of the present invention. FIG. 2 is a cross-sectional view of the image forming apparatus 10 according to the exemplary embodiment of the present invention viewed from a right side surface.

The image forming apparatus 10 has an image forming apparatus main body 12, a discharge part 14 on which an image-formed recording medium is discharged, a document reading device 16 to read a document, and an operation part 18 to operate the image forming apparatus 10.

Further, the image forming apparatus 10 is provided with an information input terminal 20 in which image information is inputted from an external device such as a personal computer.

The image forming apparatus 10 forms an image on a recording medium based on image information read with the document reading device 16 or image information inputted from the information input terminal 20.

The image forming apparatus 10 is connectable to e.g. a telephone line, and forms an image on a recording medium based on image information inputted via the telephone line. Further, the image forming apparatus 10 transmits image information read with the document reading device 16 or data inputted from the information input terminal 20 via the telephone line.

A paper-feed opening/closing member 32 is provided on a front side surface of the image forming apparatus main body 12. The paper-feed opening/closing member 32 is attached to the image forming apparatus main body 12 openably/closably using a hinge 34. FIG. 1 shows a status where the paper-feed opening/closing member 32 is opened with respect to the image forming apparatus main body 12. FIG. 2 shows a status where the paper-feed opening/closing member 32 is closed with respect to the image forming apparatus main body 12.

Further, a discharge hole 36 used for discharge of a recording medium on which an image has been formed, is formed in the image forming apparatus main body 12.

An image forming part 40, a paper feed device 42, and a conveyance passage 44 are provided in the image forming apparatus main body 12.

The image forming part 40 has a photoreceptor drum 52 used as an image holder, a charging device 54 to charge the surface of the photoreceptor drum 52, a latent image forming device 56 to form a latent image on the surface of the photoreceptor drum 52 by emitting light to the surface of the photoreceptor drum 52 charged with the charging device 54, a developing device 58 to develop the latent image formed with the latent image forming device 56 on the surface of the photoreceptor drum 52 using a developer, a transfer device 60 to transfer the developer image formed by development with the developing device 58 on the surface of the photoreceptor drum 52 to a recording medium, a cleaning device 62 to clean the developer remaining on the surface of the photoreceptor drum 52 after the transfer with the transfer device 60, and a fixing device 64 to fix the developer image transferred to the recording medium with transfer device 60 to the recording medium.

The paper feed device 42 has e.g. one recording medium container 72 to contain recording media in a stacked state, and a delivery roller 74 to deliver any of the recording media contained in the recording medium container 72.

When a predetermined or larger size of recording medium is contained in the recording medium container 72, the paper-feed opening/closing member 32 is opened. When this recording medium is contained, the rear end side of the recording medium is protruded from the image forming apparatus main body 12, and the protruded part of the recording medium is supported with the paper-feed opening/closing member 32 from the lower side in the gravitational direction.

The conveyance passage 44 is used for conveyance of the recording medium from the paper feed device 42 toward the transfer device 60, and for further conveyance of the recording medium to the discharge part 14. The delivery roller 74, a conveyance roller 76, a registration roller 78, a transfer device 60, a fixing device 64 and a discharge roller 80 are provided, along the conveyance passage 44, sequentially from the upstream side in a recording medium conveyance direction.

The conveyance roller 76 conveys the recording medium toward the registration roller 78.

The registration roller 78 temporarily stops movement of the end of the recording medium conveyed toward the transfer device 60, and restarts the movement of the end of the recording medium toward the transfer device 60 in accordance with the timing of arrival of the developer image formed on the photoreceptor drum 52 at the position of the transfer device 60.

The discharge roller 80 conveys the recording medium to which the developer image is fixed with the fixing device 64 toward the discharge part 14.

The discharge part 14 is provided on an upward surface 92 of the image forming apparatus main body 12, and has an extendable part 94 extendable from the surface 92 in a frontward direction (leftward direction in FIG. 2) in which the recording medium is discharged.

The extendable part 94 has a first extendable member 96 which can be extended from the surface 92 in the recording medium discharge direction and a second extendable member 98 which can be further extended in a frontward direction from the first extendable member 96.

The extendable part 94 supports the part of the recording medium on which the image is formed, protruded from the surface 92, from the lower side in the gravitational direction.

The document reading device 16 has a document reading device main body 102 and a document conveyance device 104 as an opening/closing body in which one end is supported rotatably with respect to the document reading device main body 102 and the other end is openably/closably provided. The document reading device 16 is provided above the image forming apparatus main body 12 so as to form a space S with respect to the discharge part 14.

A handgrip 106 used in opening/closing of the document conveyance device 104 by an operator is formed on the front side (left side and opening/closing side in FIG. 2) of the document conveyance device 104. The handgrip 106 is provided approximately at the center with respect to a rotational axis direction of the document conveyance device 104. A depression 106*a* in which the operator inserts his/her finger or the like is formed in the handgrip 106.

The document reading device 16 is attached to the image forming apparatus main body 12 so as to rotate about a rotational axis 112 of a hinge 110 with respect to the image forming apparatus main body 12.

The hinge 110 attaches the document reading device 16 to the image forming apparatus main body 12 so as to move the document reading device 16 between a first position and a second position. Note that the first position means a position in which the document reading device 16 is supported with the upward surface 92 of the image forming apparatus main body 12 from a lower position. Further, the second position means a position in which the space S is expanded in comparison with a case where the document reading device 16 is provided in the first position.

In the image forming apparatus 10, it may be arranged such that, in a status where the document reading device 16 is provided in the first position, the operator inserts his/her hand into the space S to take out the recording medium discharged to the discharge part 14, or may be arranged such that the document reading device 16 is moved to the second position, then when the space S has been expanded, the operator inserts his/her hand into the space S to take out the recording medium discharged to the discharge part 14.

For example, when a comparatively-small recording medium such as a postcard is taken out from the discharge part 14, since it is necessary to insert the hand to the rear side of the space S, it is easy to take out the recording medium when the document reading device 16 has been moved to the second position and the space S has been expanded in comparison with the case where the recording medium is taken out in a status where the document reading device 16 is in the first position.

Next, the details of the document reading device 16 will be described.

Figure 3:
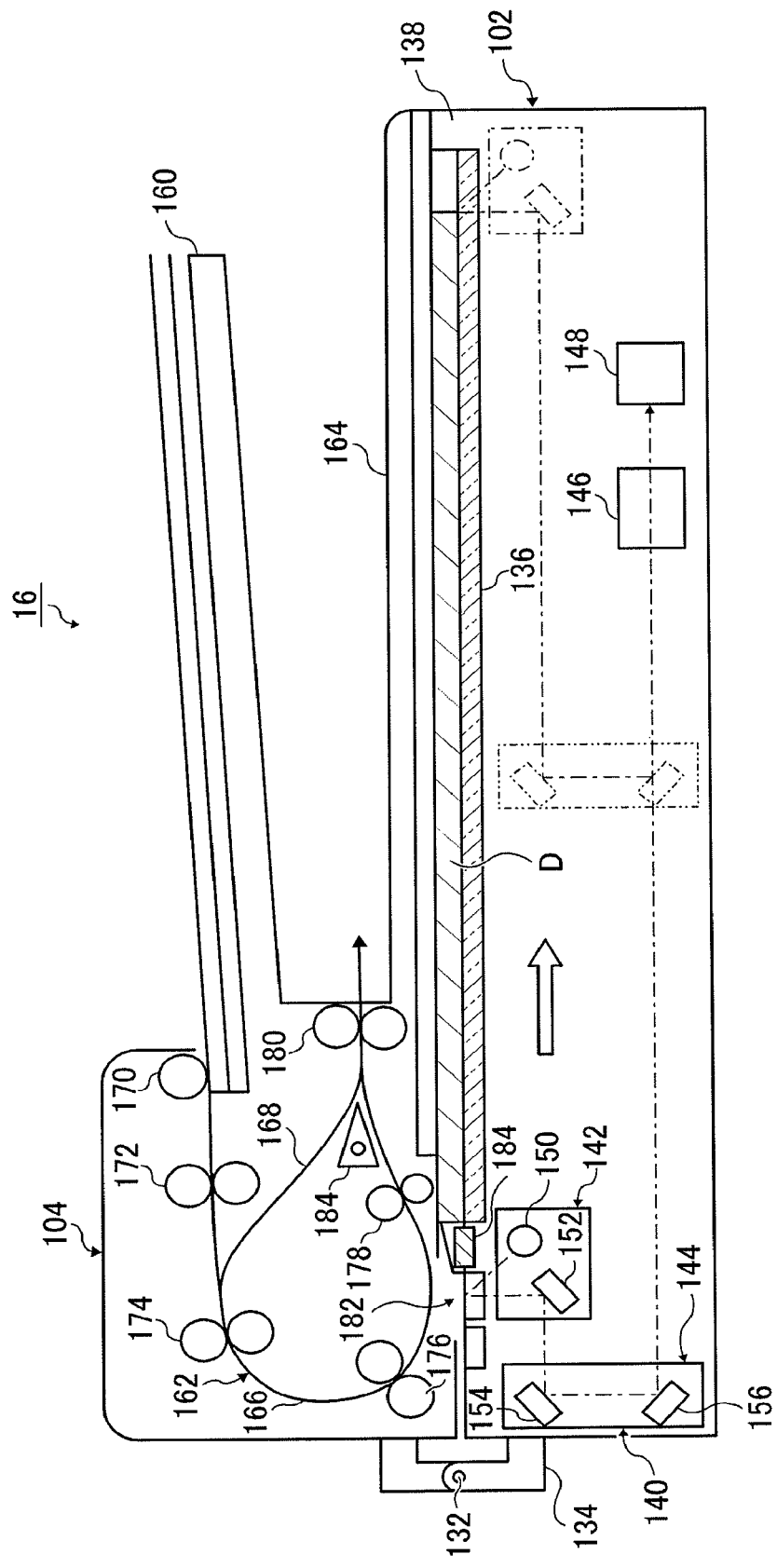
FIG. 3 is a cross-sectional view of a document reading device according to the exemplary embodiment of the present invention.
Figure 4:
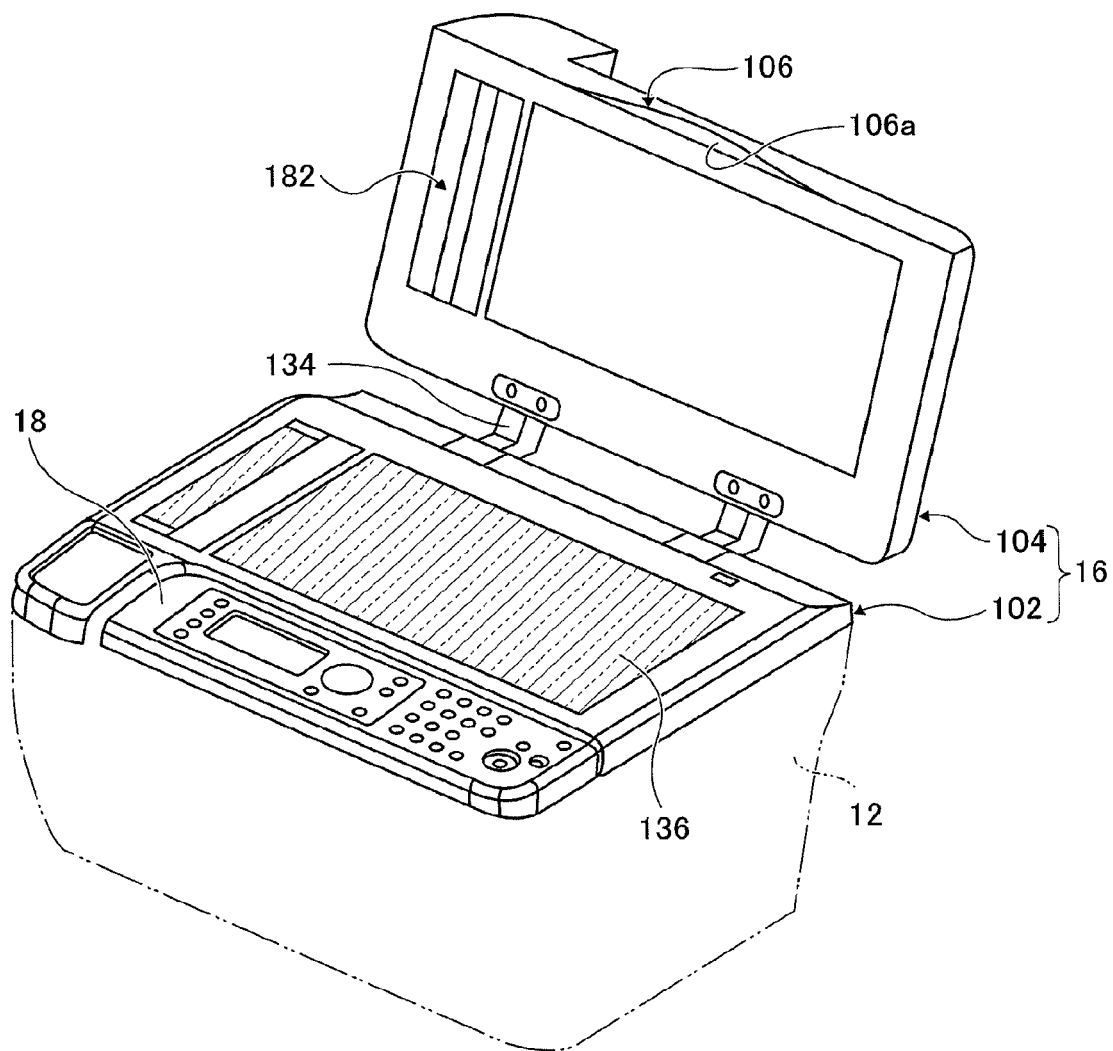
FIG. 4 is a perspective view of the image forming apparatus in which a document conveyance device according to the exemplary embodiment of the present invention is opened.

FIG. 3 is a cross-sectional view of the document reading device 16. FIG. 4 is a perspective view of the image forming apparatus 10 in which the document conveyance device 104 is opened.

The document reading device 16 has e.g. two hinges 134 having a driving shaft 132. The document reading device main body 102 and the document conveyance device 104 are connected with these hinges 134.

The document conveyance device 104 is opened/closed with respect to the document reading device main body 102 by rotation about the driving shaft 132. In a status where the document conveyance device 104 is closed, the platen member 136 of the document reading device main body 102 is covered, as shown in FIG. 3.

An opening/closing sensor 138 used as an opening/closing detection unit to detect an opened/closed status of the document conveyance device 104 is attached to the document reading device 16.

A reading part 140 which emits light to a document placed on the platen member 136 and reads the document based on reflected light from the document is attached to the document reading device main body 102.

The document reading device 16 has a function of skimming through a document D being conveyed with the document conveyance device 104 and a function of reading the document D placed on the platen member 136.

The reading part 140 has a full-rate carriage 142, a half-rate carriage 144, a lens 146 and a photoelectric conversion element 148.

The full-rate carriage 142 has a light source 150 and a first mirror 152. As indicated with an arrow in FIG. 3, with a slow-scanning direction of the document D (left side to right side in FIG. 3) as a scanning direction, the full-rate carriage 142 full-stroke moves in the document reading device main body 102 in the scanning direction.

The light source 150 is a lamp such as a halogen lamp or a xenon lamp extending in the fast-scanning direction of the document, in which a predetermined scanning width is set.

The half-rate carriage 144 has a second mirror 154 and a third mirror 156. The half-rate carriage 144 half-stroke moves in the document reading device main body 102 in the slow-scanning direction.

The lens 146 receives the reflected light of the light emitted from the light source 150 to the document D placed on the platen member 136 provided above the movement range of the full-rate carriage 142 and the half-rate carriage 144 or the document D or the like passing through a conveyed document reading position 182 to be described later, and forms an image via the first mirror 152, the second mirror 154 and the third mirror 156.

The photoelectric conversion element 148 is e.g. a three-line color CCD which receives the reflected light in the image forming position with the lens 146 and outputs analog electric signals corresponding to respective RGB light amounts in pixel units, with photodiodes provided with e.g. RGB filters (primary color filters), to a processing circuit.

The document conveyance device 104 has a document table 160 on which the document D before reading is placed (set), a document conveyance passage 162 for conveyance of the document D, and a discharge table 164 to which the document D after image reading is discharged.

The document conveyance passage 162 has a main conveyance part 166 and a reversing part 168. The main conveyance part 166 is formed in a U-shape, and along the main conveyance part 166, a pickup roller 170, a feed roller 172, a pre-registration roller 174, a registration roller 176, an out roller 178, and a discharge roller 180 are provided sequentially from the upstream side in the document conveyance direction.

The pickup roller 170 moves down when a document is fed, to pick up the document D placed on the document table 160.

The feed roller 172 retards the document D sent from the pickup roller 170 and supplies only the topmost document D.

The pre-registration roller 174 temporarily stops the document sent from the feed roller 172 to form a loop for skew correction.

The registration roller 176 temporarily stops the document D sent from the pre-registration roller 174 for control of reading timing.

When the document D is discharged, the discharge roller 180 is forward rotated, and the document is discharged via the out roller 178 and the discharge roller 180 to the discharge table 164.

In the reversing part 168, one end is connected to a main conveyance part 166 between the out roller 178 and the discharge roller 180, and the other end is connected to the main conveyance part 166 on the upstream side of the pre-registration roller 174. A reversing gate 162 is provided in the vicinity of one end of the reversing part 168.

When the document D is reversed, the discharge roller 180 is reversed when the rear end of the document D comes in the vicinity of the discharge roller 180, and the reversing gate 162 is positioned below, then the document D is guided to the reversing part 168.

It may be arranged such that the reversing gate 162 is opened with a pressing force of the document D, and closed with the self weight of the reversing gate 162, or it may be arranged such that an actuator to open/close the reversing gate 162 is provided.

The document conveyance passage 162 is provided with a conveyed document reading position 182 as a position to read the document D upon skim through of the document D being conveyed along the main conveyance part 166. The conveyed document reading position 182, provided between the registration roller 176 and the out roller 178, reads the document D sent with the document conveyance device 104.

A first reference white board 184 to reflect light emitted from the light source 150 is provided between the conveyed document reading position 182 and the platen member 136. The first reference white board 184 has a reflection surface to reflect light in reference white. For example, upon power-on of the image forming apparatus 10, the photoelectric conversion element 148 receives the reflected light (initial reference light amount light) of the light emitted from the light source 150 to the first reference white board 184 via the first mirror 152, the second mirror 154, the third mirror 156 and the lens 146.

Figure 5:
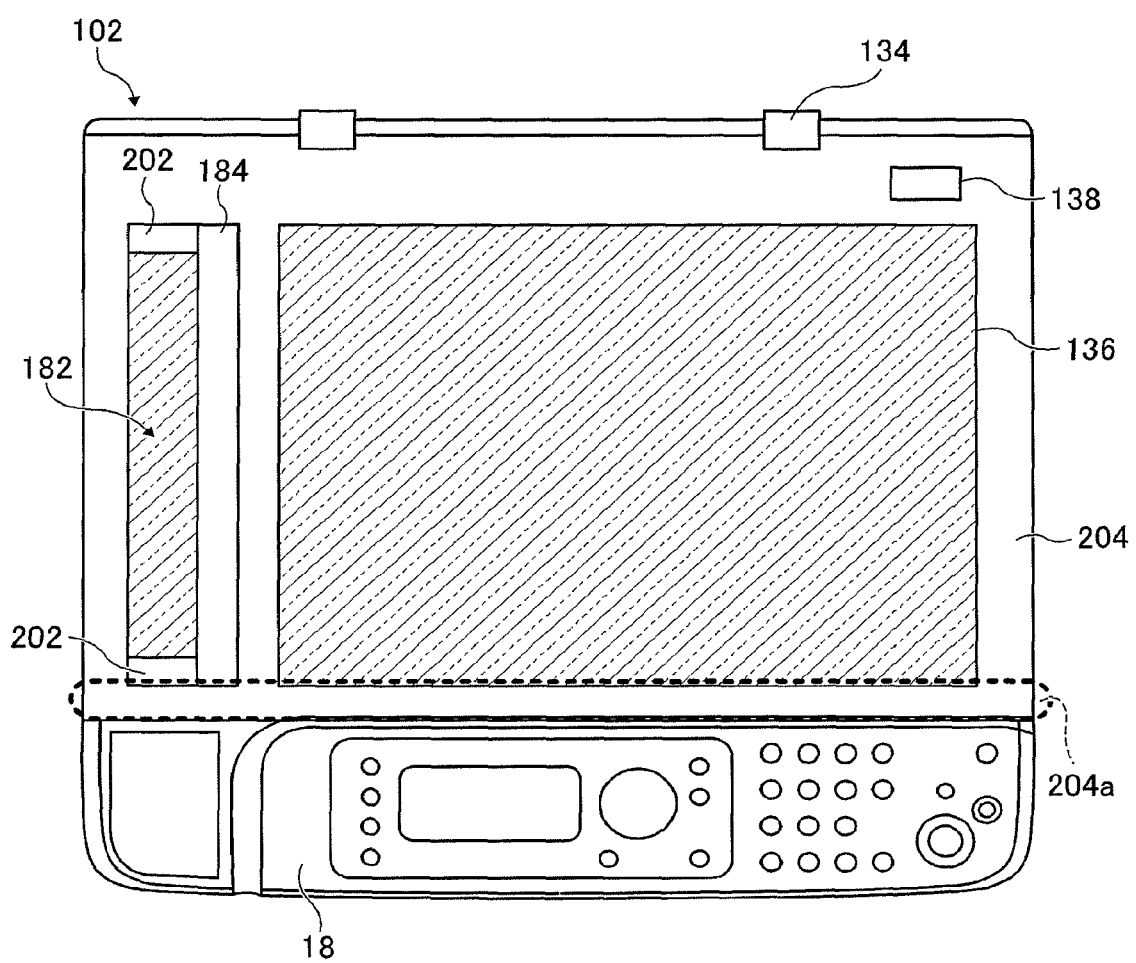
FIG. 5 is a top view of the image forming apparatus in which the document conveyance device according to the exemplary embodiment of the present invention is opened.

FIG. 5 is a top view of the image forming apparatus 10 in which the document conveyance device 104 is opened.

In the conveyed document reading position 182, a second reference white board 202 to reflect the light emitted from the light source 150 is provided at both ends.

The second reference white board 202 has a reflection surface to reflect light in reference white. For example, the photoelectric conversion element 148 receives the reflected light (reference light amount light in reading) of the light emitted from the light source 150 to the second reference white board 202 via the first mirror 152, the second mirror 154, the third mirror 156 and the lens 146, at the same time of skim through of the document D with the document reading device 16.

Outside of the platen member 136 and the conveyed document reading position 182, a covered space (room) 204 is formed. The covered space 204 is covered with the document conveyance device 104 so as to prevent leakage of light from the platen member 136 and the conveyed document position 182 to the outside. Note that in the covered space 204, a part formed on the front side (lower side in FIG. 5) of the platen member 136 and the conveyed document reading position 182 is referred to as an opening/closing side covered space 204a.

Figure 6:
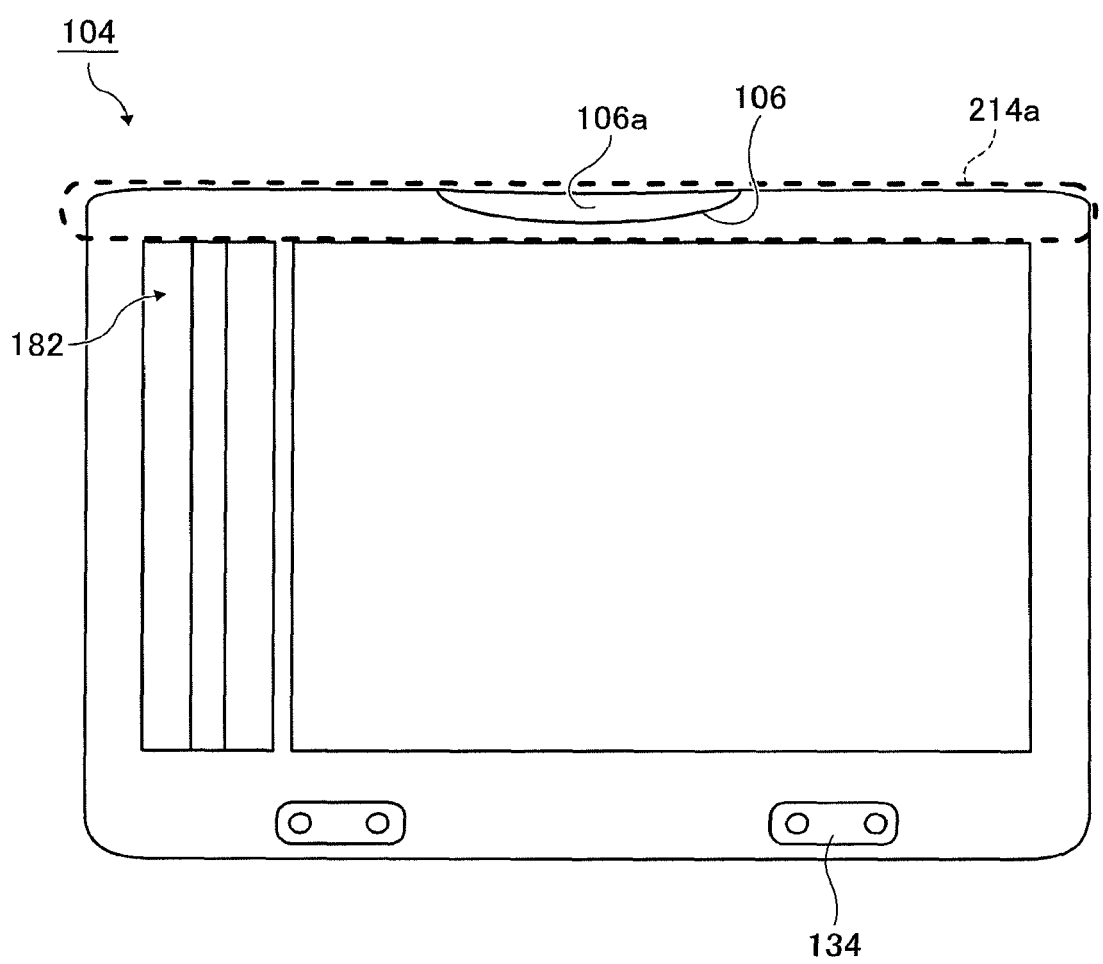
FIG. 6 is a side view of the document conveyance device according to the exemplary embodiment of the present invention showing the side in contact with a document reading device main body.

FIG. 6 shows the side of the document conveyance device 104 in contact with the document reading device main body 102.

An opening/closing side covered member 214a in contact with the opening/closing side covered space 204a in a closed state is formed on the front side (upper side in FIG. 6) of the document conveyance device 104. In the present exemplary embodiment, the length of the opening/closing side covered member 214a in a longitudinal direction is shorter than the length of the opening/closing side covered space 204a in the longitudinal direction.

In a status where the document conveyance device 104 is closed, the handgrip 106 is provided above the opening/closing side covered space 204a.

Next, the details of the handgrip 106 will be described.

Figure 7:
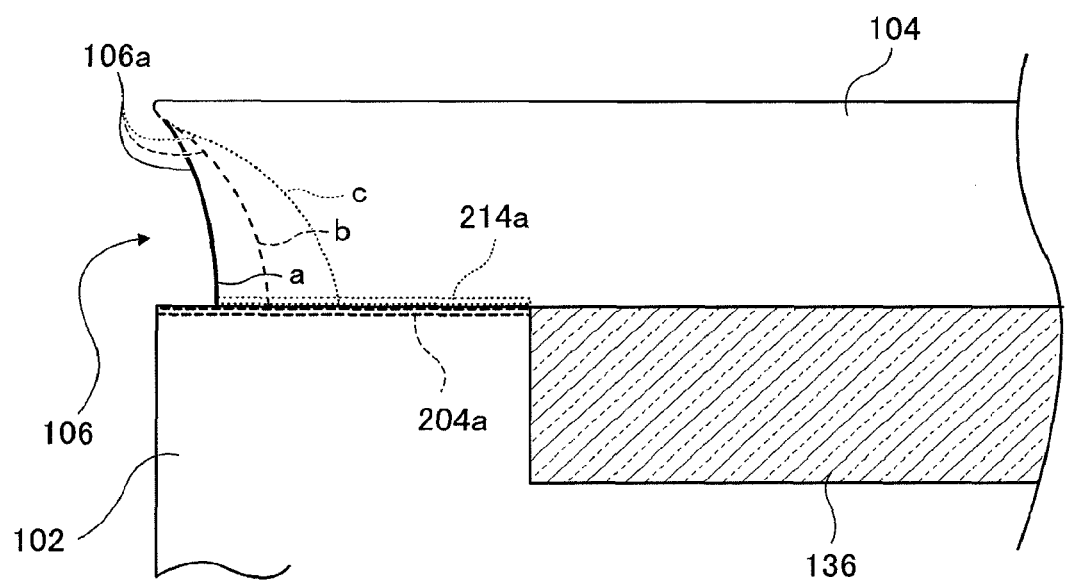
FIG. 7 is a cross-sectional view along a side surface of a handgrip in respective positions with respect to a lengthwise direction of the document conveyance device according to the exemplary embodiment of the present invention.

FIG. 7 is a cross-sectional view along a side surface of the handgrip 106 in respective positions with respect to the lengthwise direction of the document conveyance device 104. In FIG. 7, alphabet "a" denotes a position near the end of the handgrip 106 in the lengthwise direction; "b" denotes a position closer to the center than the position a; and "c" denotes a central position, in the cross-sectional view along the side surface.

In the handgrip 106, in a status where the document conveyance device 104 is closed with respect to the document reading device main body 102, a depression 106a sloped toward the inside of the document conveyance device 104 in accordance with approach to the document reading device main body 102, is formed. Further, as the depression 106a is closer to the center with respect to the rotational axis direction of the document conveyance device 104, it is sloped toward the inside of the document conveyance device 104. When the depression 106a is formed in this shape, in comparison with a case without the present structure, the range of contact between the handgrip 106 and the operator's finger or the like is increased.

In the present exemplary embodiment, the handgrip 106 is formed not to protrude from the opening/closing side covered space 204a in the document reading device main body 102 with respect to the longitudinal direction (horizontal direction in FIG. 2). That is, the handgrip 106 is formed such that an end 104a of an upper surface of the document conveyance device 104 is not positioned on the front side from the opening/closing side covered space 204a.

When the handgrip 106 is formed in this shape, in comparison with a case without the present structure, it is possible to suppress degradation of operability of a device (e.g. the operation part 18) provided on the front side of the image forming apparatus 10 and below the handgrip 106.

Figure 8:
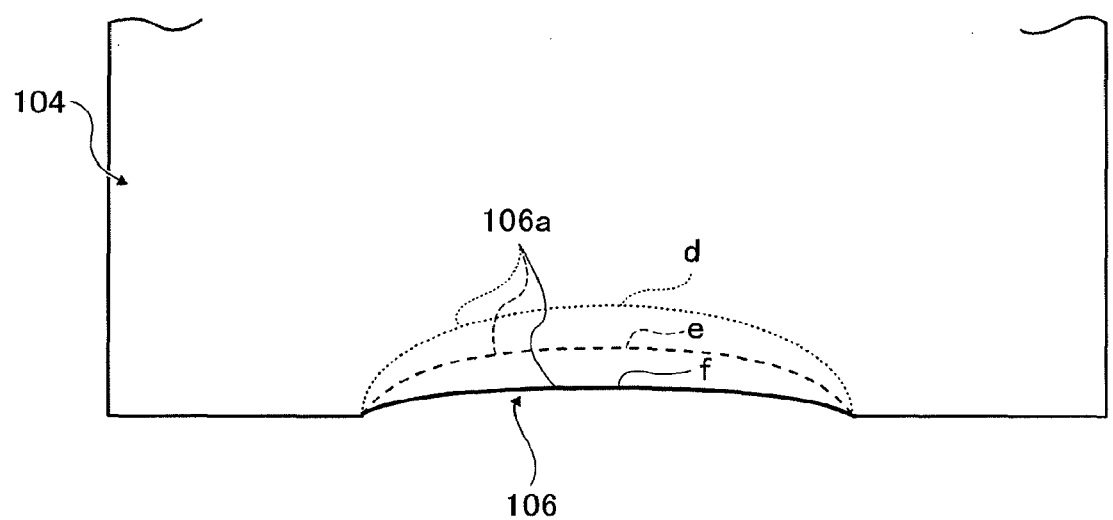
FIG. 8 is a cross-sectional view along an upper surface of the handgrip in the respective positions with respect to a thickness direction of the document conveyance device according to the exemplary embodiment of the present invention.

FIG. 8 is a cross-sectional view along an upper surface of the handgrip 106 in the respective positions with respect to a thickness direction (vertical direction in FIG. 2) of the document conveyance device 104.

In FIG. 8, alphabet "d" denotes a position in the vicinity of a lower end of the handgrip 106 in the thickness direction; "e" denotes a central portion; and "f" denotes a position in the vicinity of the upper end, in the cross-section along the upper surface.

The handgrip 106 is formed approximately at the center with respect to the lengthwise direction of the document conveyance device 104. When the handgrip 106 is formed in this shape, in comparison with a case without the present structure, the load upon opening/closing operation using the handgrip 106 is evenly applied to the entire document conveyance device 104 (or two hinges 134).

The handgrip 106 is inclined in an inward curve from the end toward the center with respect to the lengthwise direction of the document conveyance device 104. In the handgrip 106, its center is inwardly depressed symmetrically with respect to the lengthwise direction of the document conveyance device 104.

In the above description, in the handgrip 106, the depression becomes shallow from the lower end toward the upper end in the thickness direction. However, the present invention is not limited to this arrangement, and the depression may be formed to have a depression in which the center in the thickness direction is deepest. That is, it may be arranged such that the depression is inwardly depressed toward the center of the handgrip 106 (the curved surface is cater-corner in the depthwise direction) with respect to the lengthwise direction and the thickness direction of the document conveyance device 104.

Next, an operation of the handgrip 106 will be described.

Figure 9A:
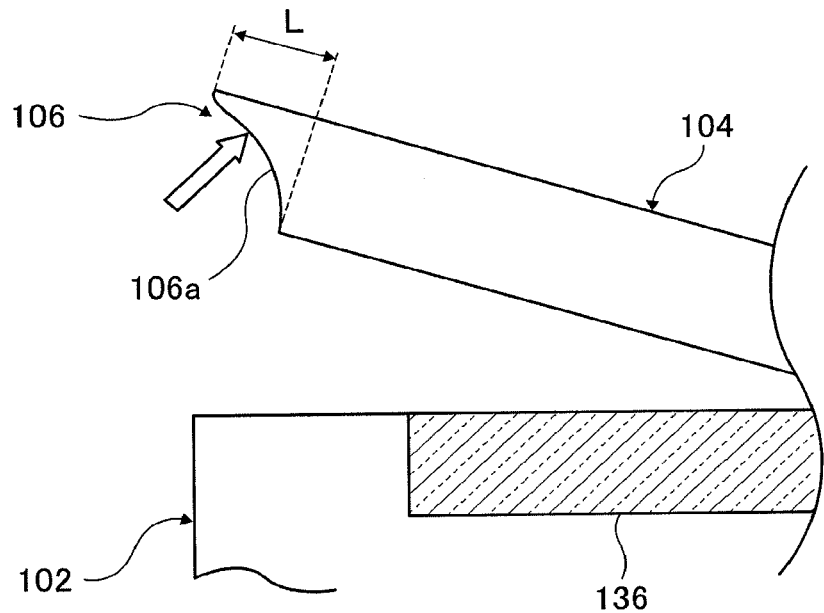
FIGS. 9A and 9B are explanatory views of an operation of the handgrip according to the exemplary embodiment of the present invention.
Figure 9B:
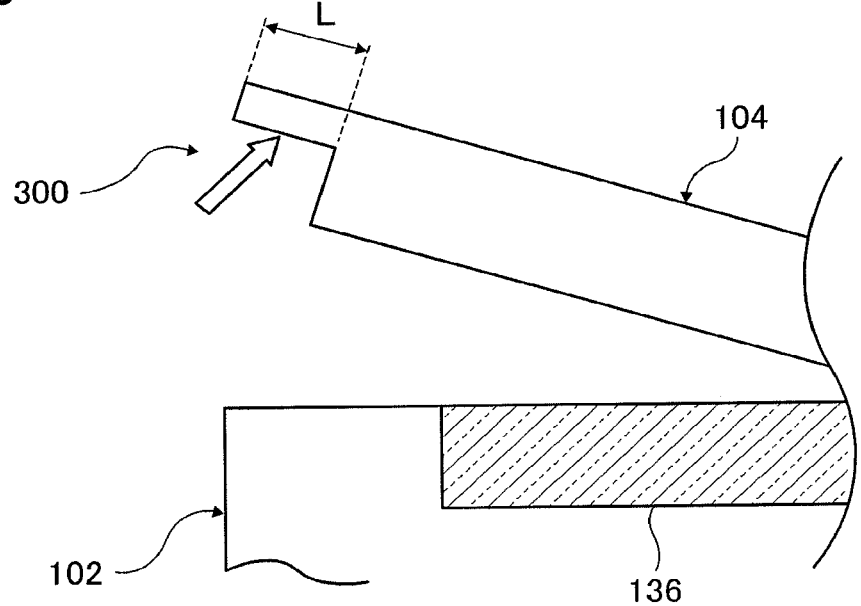

FIG. 9A shows the handgrip 106 in the present exemplary embodiment. FIG. 9B shows a handgrip 300 as a comparative example. The handgrip 300 has no curved slope, and a distance L from the end of the upper surface of the document conveyance device 104 to the end of the lower surface (the depth of the depression at the center in the lengthwise direction of the document conveyance device 104) is the same as that of the handgrip 106.

As shown in FIG. 9A, as the handgrip 106 is in frequent contact with the operator's finger or the like in the depression 106a, the operator's force is easily applied along the opening/closing direction of the document conveyance device 104.

On the other hand, as in the case of the hand grip 300 as shown in FIG. 9B, when the handgrip has no curved slope but has a linear concave shape, it hardly comes into contact with the operator's finger or the like, and further, the operator's force is hardly applied with respect to the opening/closing direction of the document conveyance device 104.

In this manner, in the handgrip 106, in comparison with a case without the depression 106a in this shape, the distance L (the depth of the depression) is reduced.

In the above-described exemplary embodiment, the document conveyance device 104 is used as an opening/closing body provided with the handgrip 106. However, the present invention is not limited to this arrangement, and is applicable to a document holder to nip-hold the document D placed on the platen member 136.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document reading device comprising:
   a main body; and
   a cover configured to be opened and closed, the cover including:
      a bottom surface that faces the main body when the cover is closed;
      a top surface that opposes the bottom surface; and
      a front surface that extends from the top surface to the bottom surface, and
   the front surface including a handgrip that is curved about a first horizontal axis, such that a curvature of the handgrip becomes shallow toward a top end of the handgrip and toward a bottom end of the handgrip.

2. The document reading device according to claim 1, wherein, in a cross-sectional view of the cover, the curvature of the handgrip extends to a front side of the front surface.

3. The document reading device according to claim 1, wherein the front surface is inwardly curved about a vertical axis that is perpendicular to the first horizontal axis.

4. The document reading device according to claim 1, wherein a length of the top end of the handgrip along the first horizontal axis is the same as that of the bottom end of the handgrip.

5. The document reading device according to claim 1, wherein the curvature of the handgrip becomes shallow toward the top and bottom ends of the handgrip by approaching horizontal.

6. The document reading device according to claim 1, wherein, in a cross-sectional view of the cover while closed, a tangent line on an outermost point of the curvature of the handgrip is vertical with respect to the first horizontal axis.

7. The document reading device according to claim 1, wherein, in a plan view, the cover includes a left portion, a right portion, and a central portion that is sandwiched between the left portion and the right portion,
   wherein the left and right portions extend further along a second horizontal axis than the central portion, and
   wherein the second horizontal axis is orthogonal to the first horizontal axis and a vertical axis.

8. A document reading device comprising:
a main body; and
a cover configured to be opened and closed, the cover including:
- a bottom surface that faces the main body and extends along a first axis and a second axis that is orthogonal to the first axis;
- a top surface that opposes the bottom surface and extends along the first and second axes; and
- a front surface that extends from the top surface to the bottom surface along a third axis that is orthogonal to the first and second axes, the front surface including a grip that is inwardly curved about the first such that a top end of the grip and a bottom end of the grip extend further along the second axis than a center of the grip.

9. The document reading device according to claim 8, wherein left and right distal ends of the grip extend further along the second axis than a central portion of the grip.

10. The document reading device according to claim 8, wherein the top end of the grip has a same length along the second axis as the bottom end of the grip.

11. The document reading device according to claim 2, wherein the curvature extends from a deepest point of the front surface toward the front side of the front surface.

\* \* \* \* \*